(12) United States Patent
Teichmann et al.

(10) Patent No.: US 11,507,627 B2
(45) Date of Patent: Nov. 22, 2022

(54) ANALYTICS CONTENT NETWORK FOR CONTENT DELIVERY EMBEDDING

(71) Applicant: SAP SE, Walldorf (DE)

(72) Inventors: Jan Teichmann, Neustadt/Weinstrasse (DE); Harikrishnan Mangayil, Bangalore (IN); Abhishek Nagendra, Bangalore (IN); Subhadeep Khan, Paschim Medinipur (IN)

(73) Assignee: SAP SE, Walldorf (DE)

( * ) Notice: Subject to any disclaimer, the term of this patent is extended or adjusted under 35 U.S.C. 154(b) by 300 days.

(21) Appl. No.: 16/720,209

(22) Filed: Dec. 19, 2019

(65) Prior Publication Data

US 2021/0191983 A1    Jun. 24, 2021

(51) Int. Cl.
*H04L 67/125*    (2022.01)
*H04L 67/133*    (2022.01)
*G06F 16/9038*   (2019.01)
*G06F 16/906*    (2019.01)

(52) U.S. Cl.
CPC ........ *G06F 16/9038* (2019.01); *G06F 16/906* (2019.01); *H04L 67/125* (2013.01); *H04L 67/133* (2022.05)

(58) Field of Classification Search
CPC . G06F 16/9038; G06F 16/906; H04L 67/125; H04L 67/40
See application file for complete search history.

(56) References Cited

U.S. PATENT DOCUMENTS

| 7,844,659 | B2 | 11/2010 | Baeuerle et al. |
|---|---|---|---|
| 8,314,798 | B2 | 11/2012 | Manickam et al. |
| 8,555,241 | B2 | 10/2013 | Teichmann |
| 8,612,927 | B2 | 12/2013 | Brunswig et al. |
| 8,627,321 | B2 | 1/2014 | Teichmann et al. |
| 8,719,224 | B2 | 5/2014 | Pfeifer et al. |
| 8,751,437 | B2 | 6/2014 | Teichmann et al. |

(Continued)

FOREIGN PATENT DOCUMENTS

WO    2016168577    10/2016

OTHER PUBLICATIONS

U.S. Appl. No. 16/048,863, Kazmaier.

(Continued)

*Primary Examiner* — John A Follansbee
*Assistant Examiner* — Raqiul A Choudhury
(74) *Attorney, Agent, or Firm* — Fish & Richardson P.C.

(57) ABSTRACT

Methods, systems, and computer-readable storage media for receiving, by an analytics content network (ACN), a configuration request through a tenant configuration application programming interface (TC-API) of a plurality of APIs, the configuration request including an identifier that uniquely identifies an analytics system tenant that is embedded in an application tenant within a customer landscape, the ACN distributing analytics content to multiple customer landscapes, determining, by the ACN, one or more analytics content that is to be distributed to the analytics system tenant at least partially based on the identifier, providing, by the ACN, a content package that includes the one or more analytics content within an API payload for response to the request, and transmitting, by the ACN, a response to the request through the TC-API, the response comprising the API payload.

20 Claims, 5 Drawing Sheets

(56) References Cited

U.S. PATENT DOCUMENTS

| | | | |
|---|---|---|---|
| 8,793,272 | B2 | 7/2014 | Teichmann et al. |
| 8,874,601 | B2 | 10/2014 | Hermanns et al. |
| 8,892,667 | B2 | 11/2014 | Branswig et al. |
| 8,924,269 | B2 | 12/2014 | Seubert et al. |
| 9,171,039 | B2 | 10/2015 | Teichmann et al. |
| 9,508,048 | B2 | 11/2016 | Said et al. |
| 2008/0021758 | A1 | 1/2008 | Teichmann et al. |
| 2009/0172003 | A1 | 7/2009 | Jentsch et al. |
| 2011/0087708 | A1 | 4/2011 | Teichmann et al. |
| 2013/0166675 | A1 | 6/2013 | Giebel et al. |
| 2016/0028737 | A1* | 1/2016 | Srinivasan ............ H04L 63/102 726/1 |
| 2016/0210273 | A1 | 7/2016 | Kelappan et al. |
| 2017/0004323 | A1* | 1/2017 | Balachandran ......... G06F 16/13 |
| 2017/0053242 | A1 | 2/2017 | Ayyaswami et al. |
| 2017/0132195 | A1 | 5/2017 | Gothi et al. |
| 2018/0046678 | A1* | 2/2018 | Wilding ................. G06F 11/30 |
| 2018/0074873 | A1 | 3/2018 | Iqbal et al. |
| 2019/0163797 | A1 | 5/2019 | Shetty et al. |
| 2019/0179928 | A1 | 6/2019 | Tiwari et al. |
| 2020/0136825 | A1* | 4/2020 | Gupta .................. H04L 9/3213 |
| 2021/0112059 | A1* | 4/2021 | Heldman .............. H04L 61/103 |

OTHER PUBLICATIONS

Extended European Search Report issued in European Application No. 20203194.4 dated Apr. 14, 2021, 8 pages.

Blogs.sap.com [online], "Embedding SAP Analytics Cloud Story with URL API and SAML2 SSO based on WSO2 Identity Server" Sep. 30, 2017, [retrieved on May 18, 2022], retrieved from : URL <https://blogs.sap.com/2017/09/30/embedding-sap-analytics-cloud-story-with-url-api-and-saml2-sso-based-on-wso2-identity-server/>, 21 pages.

Blogs.sap.com [online]. "SAP Analytics Cloud APIs: Getting Started Guide" Apr. 20, 2018, [retrieved on May 18, 2022], retrieved from : URL <https://blogs.sap.com/2018/04/20/sap-analytics-cloud-apis-getting-started-guide/>, 19 pages.

Communication Pursuant to Article 94(3) EPC issued in European Application No. 20203194.4 dated May 11, 2022, 13 pages.

Wiki.scn.sap.com [online], "Embed SAP Analytics Cloud Story in SAP Cloud Platform HTML5 Application" Jun. 19, 2019, [retrieved on May 18, 2022], retrieved from : URL <https://wiki.scn.sap.com/wiki/display/BOC/Embed+SAP+Analytics+Cloud+Story+in+SAP+Cloud+Platform+HTML5+Application>, 21 pages.

\* cited by examiner

ANALYTICS CONTENT NETWORK FOR CONTENT DELIVERY EMBEDDING

BACKGROUND

Software systems can be provided, which enable enterprises to run their operations. Through use of the software systems, enterprises can generate and accumulate massive amounts of enterprise data. Example enterprise data can include, without limitation, product data, financial data, human resources (HR) data, and the like. Enterprise, however, need to understand the enterprise data in order to effectively conduct operations. Intelligent analytics systems have been developed, which process enterprise data to provide useful information, which can be referred to as insights. Insights can be described as statistics, facts, trends, and the like, that can be determined from the enterprise data. Example insights include, without limitation, highest rated product, revenue, margin, actual sales, forecast sales, and the like.

To view and understand enterprise data and insights, analytics content can be provided. Example analytics content includes, without limitation, dashboards, KPI definitions, and planning scenarios. Analytics content can be provided by, for example, a service provider that provides the analytics system, third-party developers, and OEMs. For example, a service provider that provides the analytics system can provide one or more dashboards as analytics content, which a customer that uses the analytics system can use to view enterprise data and insights. In this manner, best-of-breed analytics content can be provided, and each customer is not required to create their own analytics content.

In traditional analytics systems, a file-based approach is implemented to provide analytics content. In the file-based approach, analytics content is down- and uploaded to files (e.g., .tgz files (GZIP Compressed Tar Archive files)). However, analytics content has to be provisioned to tenants (e.g., executing an application, in which the analytics content is to be provided). If the analytics content is developed and owned by the service provider (e.g., SAP SE) or third-parties (e.g., partners of the enterprise), the analytics content has to be shipped together with the application and has to be installed at the point in time when the tenants are upgraded to a respective release of the application.

SUMMARY

Implementations of the present disclosure are directed to an analytics content network. More particularly, implementations of the present disclosure are directed to an analytics content network for delivery of analytics content to applications having analytics systems embedded therein.

In some implementations, actions include receiving, by an analytics content network (ACN), a configuration request through a tenant configuration application programming interface (TC-API) of a plurality of APIs, the configuration request including an identifier that uniquely identifies an analytics system tenant that is embedded in an application tenant within a customer landscape, the ACN distributing analytics content to multiple customer landscapes, determining, by the ACN, one or more analytics content that is to be distributed to the analytics system tenant at least partially based on the identifier, providing, by the ACN, a content package that includes the one or more analytics content within an API payload for response to the request, and transmitting, by the ACN, a response to the request through the TC-API, the response comprising the API payload. Other implementations of this aspect include corresponding systems, apparatus, and computer programs, configured to perform the actions of the methods, encoded on computer storage devices.

These and other implementations can each optionally include one or more of the following features: the plurality of APIs comprises an export API that is used to export analytics content from one or more analytics content providers to the ACN; the plurality of APIs includes an import API that is used to import analytics content from the ACN to one or more analytics system tenants across the multiple customer landscapes; the content package is specific to the analytics system tenant; and the analytics content includes one or more of a dashboard, a key performance indicator (KPI) definition, and a planning scenario.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DESCRIPTION OF DRAWINGS

Like reference symbols in the various drawings indicate like elements.

DETAILED DESCRIPTION

Figure 1:
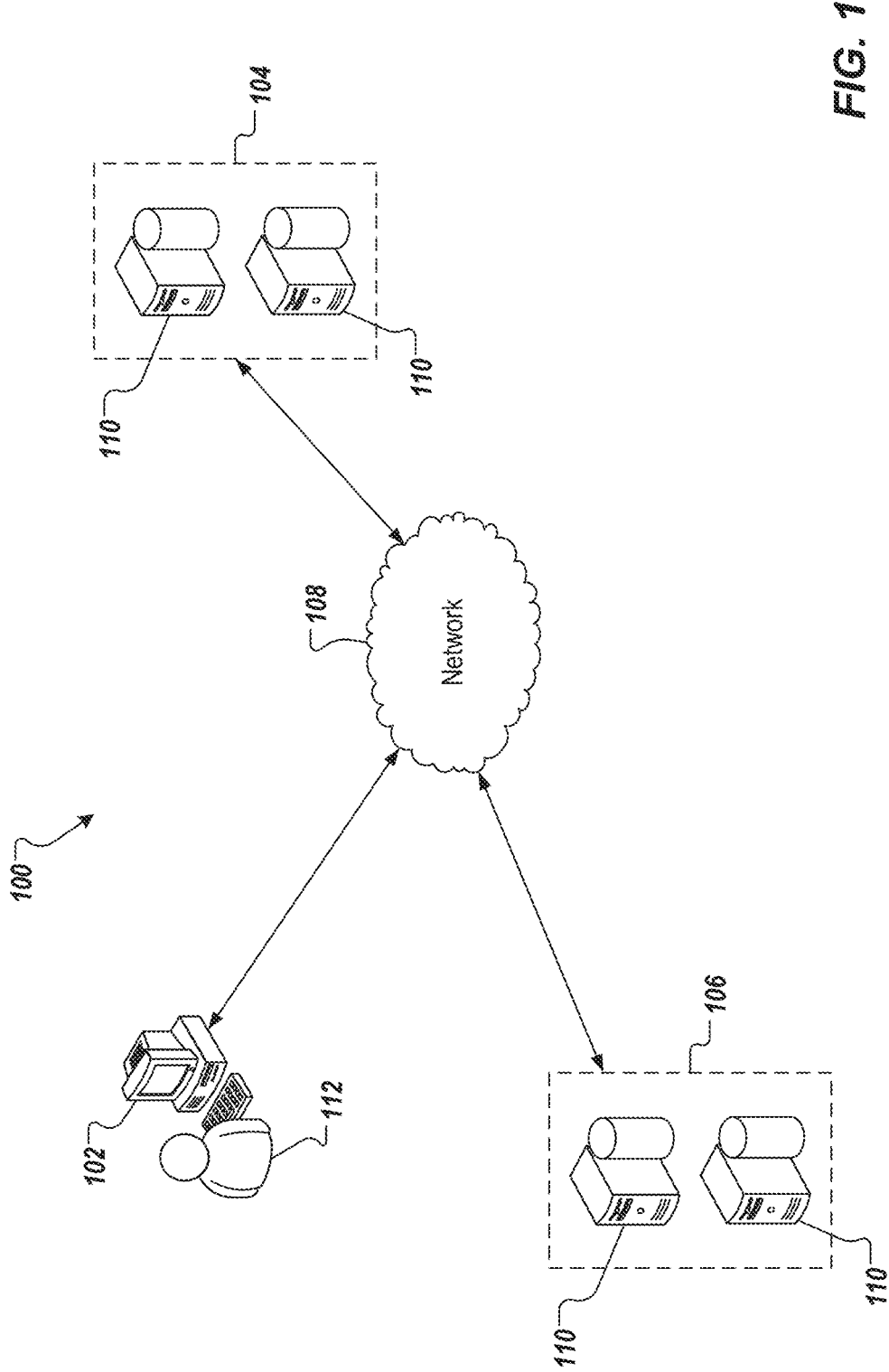
FIG. 1 depicts an example architecture that can be used to execute implementations of the present disclosure.

Implementations of the present disclosure are directed to an analytics content network. More particularly, implementations of the present disclosure are directed to an analytics content network for delivery of analytics content for one or more applications having analytics systems embedded therein. Implementations can include actions of receiving, by an analytics content network (ACN), a configuration request through a tenant configuration application programming interface (TC-API) of a plurality of APIs, the configuration request including an identifier that uniquely identifies an analytics system tenant that is embedded in an application tenant within a customer landscape, the ACN distributing analytics content to multiple customer landscapes, determining, by the ACN, one or more analytics content that is to be distributed to the analytics system tenant at least partially based on the identifier, providing, by the ACN, a content package that includes the one or more analytics content within an API payload for response to the request, and transmitting, by the ACN, a response to the request through the TC-API, the response comprising the API payload.

To provide further context for implementations of the present disclosure, and as introduced above, software systems can be provided, which enable enterprises to run their operations. Example software systems can include, without limitation, on-premise systems (e.g., SAP Business Intelligence (BI)) and cloud-based systems (e.g., SAP Analytics Cloud (SAC), SAP Analytics Hub). In some examples, an on-premise system is operated locally to the enterprise, such as within a server system and network operated by the enterprise. In some examples, a cloud-based system is operated externally to the enterprise, such as within a server system and network operated by a third-party service provider (e.g., SAP SE) on behalf of the enterprise. While implementations of the present disclosure are described in further detail with reference to example applications and systems provided by SAP SE, it is contemplated that implementations of the present disclosure can be realized with any appropriate applications and/or systems provided by any service provider.

In some examples, an enterprise can include operations that cross one or more lines of business. A line of business (LoB) can generally be described as a segment of operations that contribute to the overall operations of an enterprise. Example of lines of business can include, without limitation, finance, human resources (HR), customer relationship management (CRM), logistics, compliance, procurement, and supply chain planning.

In some implementations, an enterprise can operate using one or more computer-executed applications, each application supporting one or more lines of business (e.g., applications provided in the SAP Business Suite). For example, for a particular LoB, an application can provide functionality that supports operations within the LoB. By way of non-limiting example, the HR LoB can be supported by a human resources management (HRM) application. An example HRM application includes, without limitation, SAP SuccessFactors provided by SAP SE. As another non-limiting example, the CRM LoB can be supported by a CRM application. An example CRM application can include, without limitation, SAP CRM provided by SAP SE.

In accordance with implementations of the present disclosure, analytical data can be provided in one or more applications, such as applications used by enterprises to perform operations. For example, an analytics system (e.g., SAC) can process enterprise data to generate analytical data, which analytical data can be provided to and displayed within a user interface (UI) provided by an application. For example, for CRM, analytical data can include, without limitation, growth, pipeline, sales team performance, target planning, and quota planning. As another example, for HR, analytical data can include recruitment key performance indicator (KPI) values, requisitions, positions, recruitment process analysis, and talent pipeline. Accordingly, the analytics system can generate analytical data that is to be provided to one or more applications for display (e.g., within one or more UIs).

In providing analytical data to application, an analytics system can be embedded within an application. In this manner, functionality of the analytics system, although separate from the application, is directly available within the application. In some implementations, the application is executed within an application tenant (e.g., an S/4 tenant) and the analytics system is executed within an analytics system tenant (e.g., a SAC tenant), both tenants being specific to a consumer (e.g., an enterprise that conducts operations using the application and analytics system).

In providing analytics systems to enterprises, service providers (e.g., SAP SE) seek to provide best-of-breed analytics content across multiple LoBs, the analytics content being provided out-of-the-box as enterprises use the analytics systems. Example analytics content includes, without limitation, dashboards, KPI definitions, and planning scenarios. In traditional analytics systems, a file-based approach is implemented. In the file-based approach, analytics content is down- and uploaded to files (e.g., .tgz files (GZIP Compressed Tar Archive files)). However, analytics content has to be provisioned to tenants (e.g., executing an application, in which the analytics content is to be provided). If the analytics content is developed and owned by the service provider (e.g., SAP SE) or third-parties (e.g., partners of the enterprise), the analytics content has to be shipped together with the application and has to be installed at the point in time when the tenants are upgraded to a respective release of the application.

In view of the above context, implementations of the present disclosure provide an analytics content network (ACN) for delivering analytics content. More particularly, implementations of the present disclosure are directed to using the ACN to deliver analytics content for analytics systems embedded in applications. In some examples, the ACN can be described as a comprehensive content management system in an analytics ecosystem. For example, the ACN enables lifecycle management of analytics content, discovery and importation of analytics content packages, marketing and monetization of analytics content packages, delivering analytics content for analytics systems embedded in applications, and enabling collaboration for developer communities. For example, and as described in further detail herein, the ACN enables pre-defined analytics content to be made available to consumers using applications having analytics embedded therein.

In some implementations, analytics content is provided for use in one or more applications. For example, and without limitation, a dashboard can be displayed within a UI of an application supporting a finance LoB, the dashboard being provided as analytics content to the application. That is, the dashboard can be provided as analytics content from the ACN to the application and the application can display the dashboard (e.g., in a UI). In some examples, analytical data (e.g., financial performance data) provided from an analytics system is displayed within the dashboard.

In accordance with implementations of the present disclosure, analytics content (content packages) are exportable from the ACN, and each customer can import one or more content packages for use within an application (e.g., executing in an application tenant). In some examples, storage of content within ACN is provided as cloud-based storage. For example, multiple Javascript object notation (JSON) files are provided for each content and are stored in a cloud document persistence service (e.g., Amazon S3 in case of CF AWS). In some examples, an analytics system tenant can be embedded within an application tenant, such that functionality of the analytics system, although independent of the application, is directly available within the application. Analytics content is provided from the ACN for use in the application. By way of non-limiting example, the analytics content can include a dashboard (e.g., graphical representation) that is displayed within the application. To achieve this, the analytics content (provided in a content package) is imported to the analytics system tenant within the application tenant and is configured to point to the connection of the application tenant. In this manner, when the customer opens the application tenant and views documents provided by the analytics system, the analytics content is available for display and use.

In some examples, embedding of an analytics system tenant in an application tenant can include embedding the analytics system tenant within a frame (e.g., iframe) of the application tenant, such that at least a portion of a UI of the analytics system tenant is displayed within a UI of the application tenant. In some examples, embedding of an analytics system tenant in an application tenant can include the application tenant using public APIs provided by the analytics system tenant to perform actions (e.g., analytics functionality).

FIG. 1 depicts an example architecture 100 in accordance with implementations of the present disclosure. In the depicted example, the example architecture 100 includes a client device 102, a server system 104, a server system 106, and a network 108. The server systems 104, 106 each include one or more server devices and databases 110 (e.g., processors, memory). In the depicted example, a user 112 interacts with the client device 102.

In some examples, the client device 102 can communicate with the server systems 104, 106 over the network 108. In some examples, the client device 102 includes any appropriate type of computing device such as a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, or an appropriate combination of any two or more of these devices or other data processing devices. In some implementations, the network 106 can include a large computer network, such as a local area network (LAN), a wide area network (WAN), the Internet, a cellular network, a telephone network (e.g., PSTN) or an appropriate combination thereof connecting any number of communication devices, mobile computing devices, fixed computing devices and server systems.

In some implementations, the server systems 104, 106 each include at least one server and at least one data store. In the example of FIG. 1, the server systems 104, 106 are each intended to represent various forms of servers including, but not limited to a web server, an application server, a proxy server, a network server, and/or a server pool. In general, server systems accept requests for application services and provides such services to any number of client devices (e.g., the client device 102 over the network 106).

In accordance with implementations of the present disclosure, the server system 104 can host an on-premise system (e.g., one or more applications), and the server system 106 can host one or more cloud-based systems (e.g., SAP Analytics Cloud, SAP Analytics Hub). In some implementations, a cloud-based system further includes an ACN that is used to provision analytics content to one or more applications. For example, a customer (e.g., an enterprise) can use an application (e.g., SAP SuccessFactors) in a tenant-based scenario, which includes provisioning of the application for a customer within an application tenant that is specific to the customer. Further, and in accordance with implementations of the present disclosure, the application can include an analytics system (e.g., SAC) embedded therein. For example, the analytics system can be provided in an analytics system tenant that is embedded in the application tenant.

As introduced above, implementations of the present disclosure are directed to an ACN that enables distribution of analytics content for applications having an analytics system embedded therein. More particularly and as described in further detail herein, analytics content is provisioned from the ACN for use with analytics functionality provided by an analytics system that is embedded within an application. That is, for example, the ACN supports import and export of analytics content to and from resources (e.g., cloud-based resources). For example, the analytics system providing analytics functionality within an application can include a UI (e.g., a "Content Library" UI) that enables a user (e.g., an agent of a customer) to access analytics content from the ACN.

Figure 2:
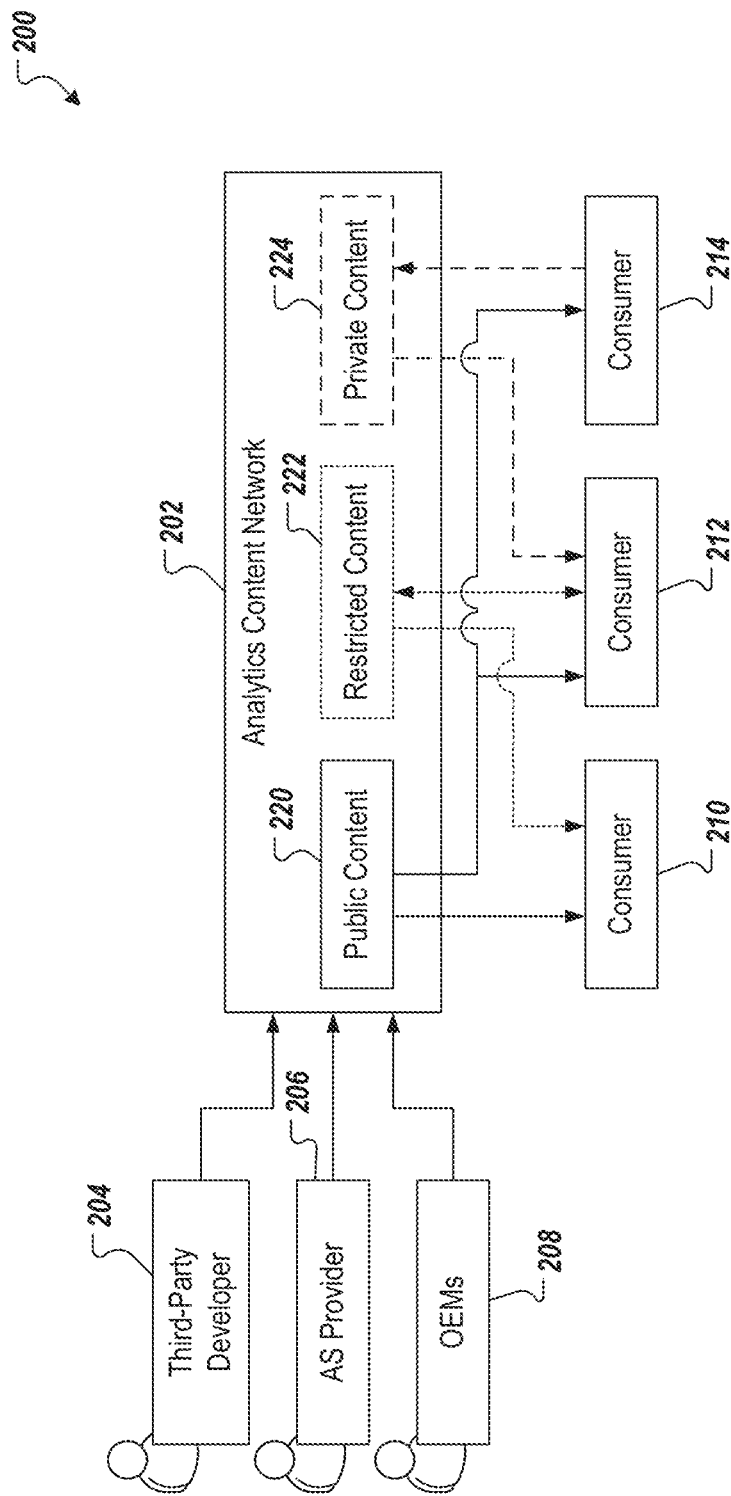
FIG. 2 depicts an example conceptual architecture in accordance with implementations of the present disclosure.

FIG. 2 depicts an example conceptual architecture 200 in accordance with implementations of the present disclosure. In the depicted example, the example conceptual architecture 200 includes an ACN 202, analytics content creators 204, 206, 208, and analytics content consumers 210, 212, 214. The ACN 202 includes a public analytics content store 220, a restricted analytics content store 222, and a private analytics content store 224. In some examples, one or more of the analytics content creators 204, 206, 208 provide analytics content that is published to the ACN 202. Example analytics content sources can include, without limitation, a third-party developer (analytics content source 204), an analytics system provider (analytics content source 206) (e.g., SAP SE, which provides SAC), and an OEM (analytics content source 208). In some examples, an OEM can include an enterprise that provides an application, within which the analytics system is embedded. For example, an OEM can include SAP SE, which provides SAP SuccessFactors, within which SAC can be embedded. In some examples, another OEM can provide their own proprietary application, within which SAC can be embedded.

In general, the analytics content creators create one or more types of analytics content. Example analytic content can include, without limitation, stories, models, dimensions, connections, Value-Driver Trees (VDT), dashboards, KPI definitions, and planning scenarios. If authorized, a content creator can export their analytics content to the ACN 202 by creating a content package, which contains one or more items of analytics content. In some examples, content is created using an analytics system tenant and is exported to the ACN 202. For a pre-defined content scenario (e.g., content provided by the AS provider 206), content is created using an internal analytics system tenant, is exported to the ACN 202, and is available to all analytics system tenants. In some examples, an analytics content administrator can view all available content packages. If authorized, one or more content packages can be imported from the ACN into one or more analytics system tenants. In this manner, the analytics content is available for use in the respective analytics system tenants.

Example use cases for analytics content can include template content, demo content, and so-called "out-of-the-box" usable content. In some examples, template content includes analytics content that can be populated (e.g., with enterprise data, visualizations, analytical data), and can be modified by users. In some examples, demo content can be described as a lighter variant of template content, which typically comes with demo data (e.g., demo enterprise data) in the content package. In this manner, the analytics content can be demoed within the analytics system tenant immediately using the demo data, but is not usable in a production scenario. In this manner, a user can test the analytics content before importing a production-usable version of the analytics content. In some examples, the "out-of-the-box" usable analytics content is delivered together with applications which "fit" to the analytical content, and which keep its data actual.

In further detail, creation of analytics content can be described as a development task. For example, a developer (e.g., computer programmer) develops the analytics content in computer-executable code. For example, a dashboard is programmatically defined and is stored in one or more files (e.g., content packages). When ready for consumption (e.g., after final review, testing) the analytics content is exported to the ACN 202 (e.g., the developer manually exports content packages).

In some implementations, the analytics content consumers 210, 212, 214 represent one or more enterprises (customers) that consume applications and analytics systems provided by the service provider 206 (e.g., SAP SE). In some examples, the analytics content consumers 210, 212, 214 each represent one or more application tenants each embedded with an analytics system tenant, as described herein. In accordance with implementations of the present disclosure, each of the analytics content consumers 210, 212, 214 receives analytics content from the ACN 202. For example, the analytics system tenant of each of the analytics content consumers 210, 212, 214 receives analytics content from the ACN 202. Although not depicted in FIG. 2, but as described in further detail herein, the analytics content is received from the ACN 202 through one or more application programming interfaces (APIs).

In the example of FIG. 2, each of the analytics content consumers 210, 212, 214 receives the public analytics content from the public analytics content store 220. For example, the public analytics content can include a dashboard provided by the service provider (e.g., SAP SE), the dashboard being made available to all consumers of an application (e.g., SAP SuccessFactors) having analytics embedded therein. In some examples, the public analytics content is provided on a pull basis. That is, for example, to receive the public analytics content, a consumer sends a call for the public analytics content to the ACN 202 (e.g., through an API).

In the example of FIG. 2, the consumer 210 and the consumer 212 each receive the restricted analytics content from the restricted analytics content store 222. In some examples, the restricted analytics content is restricted to particular consumers. For example, an OEM can restrict the restricted analytics content to its customers. In some examples, the restricted analytics content is provided on a pull basis and/or a push basis. For example, in a pull basis, to receive the restricted analytics content, a consumer sends a call for the restricted analytics content to the ACN 202 (e.g., through an API). As another example, in a push basis, the restricted analytics content is automatically sent to the consumers 210, 212. For example, the restricted analytics content can be automatically sent in response to an update of the restricted analytics content.

In the example of FIG. 2, the consumer 212 receives private analytics content from the private analytics content store 224 and the consumer 214 provides private analytics content to the private analytics content store 222. In some examples, each consumer can create their own analytics content as private analytics content, and can transport the private analytics content from one of their analytics system tenants to another one of their analytics system tenants. In the example of FIG. 2, the consumer 214 can be a first analytics system tenant of an enterprise and the consumer 212 can be a second analytics system tenant of the enterprise, the consumer 214 transporting private analytics content to the consumer 212 through the ACN 202.

Figure 3:
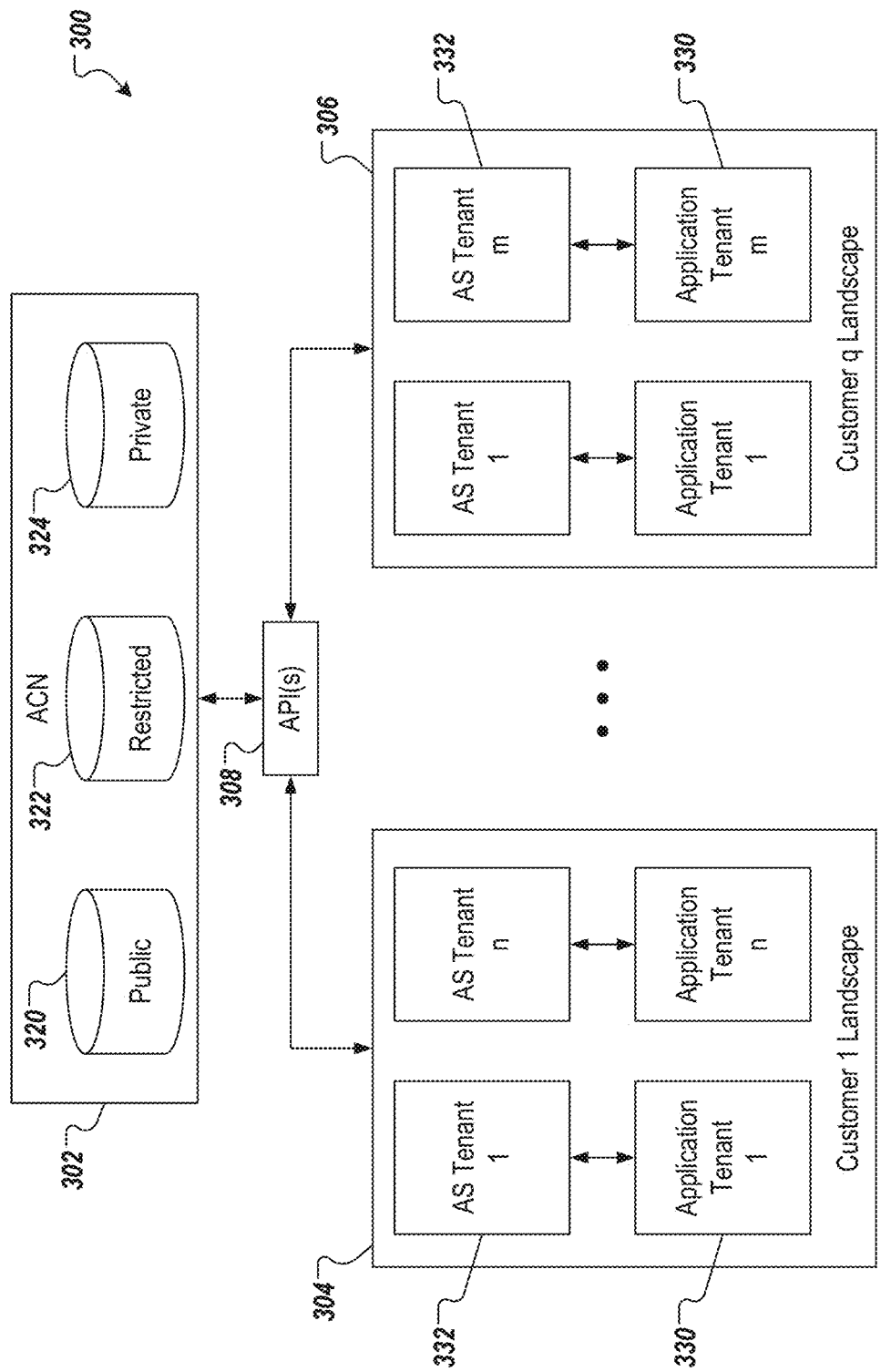
FIG. 3 depicts an example architecture in accordance with implementations of the present disclosure.

FIG. 3 depicts an example architecture 300 in accordance with implementations of the present disclosure. In the depicted example, the example architecture 300 includes an ACN 302, customer landscapes 304, 306, and one or more APIs 308 (e.g., REST APIs), through which the ACN 302 communicates with each of the customer landscapes 304, 306. In the depicted example, each of the customer landscapes 304, 306 includes one or more applications tenants 330 and respective analytics system tenants 332. In accordance with implementations of the present disclosure, and as described herein, each application tenant 330 is embedded with a respective analytics system tenant 332, which receives analytics content from the ACN 302. The ACN 302 includes a public analytics content store 320, a restricted analytics content store 322, and a private analytics content store 324, as similarly described above with reference to FIG. 2.

In accordance with implementations of the present disclosure, delivery of analytics content from the ACN 302 to one or more of the analytics system tenants 332 is automatically executed. For example, at provisioning of an analytics system tenant 332, analytics content that is relevant to the particular analytics system tenant 332 and/or customer is provided from the ACN 302. Automated provisioning of the analytics content enables time- and resource-efficient distribution of the analytics content, particularly in the case of 10s, 100s, or 1000s of tenants. In some examples, different tenants receive different analytics content. For example, an application tenant 330 of the customer landscape 304 can execute a first application (e.g., SAP SuccessFactors) that is embedded with the analytics system through the analytics system tenant 332 and receives first analytics content that is relevant to the first application (e.g., a HR dashboard for displaying analytical data, such as, recruitment KPI values, requisitions, positions, recruitment process analysis, and talent pipeline). As another example, an application tenant 330 of the customer landscape 306 can execute a second application (e.g., SAP CRM) that is embedded with the analytics system through the analytics system tenant 332, and receives second analytics content that is relevant to the second application (e.g., a CRM dashboard displaying analytical data, such as, growth, pipeline, sales team performance, target planning, and quota planning). In some examples, the analytics content that is to be sent to an analytics system tenant can be determined based on a universally unique identifier (UUID) that uniquely identifies the analytics system tenant among multiple analytics system tenants.

In some implementations, multiple types of analytics content delivery into tenants are provided, and can range from simple to advanced. Example types include, without limitation, manual analytics content delivery, automated-simple analytics content delivery (also referred to herein as light-embedding), and automated-advanced analytics content delivery (also referred to herein as deep-embedding).

In some examples, manual analytics content delivery refers to scenarios, in which a user (e.g., an agent/employee of a customer) of an application manually requests analytics content. For example, the user can open a content library using a UI of the application and can select one or more content packages. In response, a request is submitted to the ACN 302 through the API(s) 308 to import the analytics content and use the analytics content within the application. The manual analytics content delivery is typically used in case where an application has few tenants.

In some examples, in light-embedding, content packages are deployed through a tenant configuration API (TC-API), which is provided as one of the APIs 308. In some examples, the TC-API provides for tenant configuration. For example, upon initiation of an analytics system tenant, a call can be made through the TC-API for a configuration file that is used to configure the analytics system tenant (e.g., https://api.analytics.system/oem//tenants/<AS_tenant uuid>/config). For example, the call identifies a particular tenant using a UUID assigned to the tenant and requests computer-executable configuration instructions (config). In some examples, one of the configurations is "ACN content import" (e.g., "SetAcnPackage" in the API payload). In some examples, the particular analytics content can be determined based on the UUID of the tenant. For example, the UUID can be mapped to one or more analytics content, which is then provided in a content package to be included in the API payload sent in response to the configuration request. In this manner, the content package (containing the analytics content that is to be delivered to the analytics system tenant) is provided in the API payload that is transmitted to the analytics system tenant.

In some examples, authentication is provided using API keys. For example, each analytics system tenant includes an API key that is provided with the API call and authenticates the analytics system tenant for receipt of the content package(s). The API key can include an encrypted value that the API can use to authenticate the source of the API call (i.e., the tenant).

In some examples, in deep-embedding, content packages are deployed through a set of analytics system tenant content import/export APIs, which are provided in the APIs 308. In some examples, deep-embedding is used in scenarios where content packages are managed by respective development teams. For example, for some analytics content, creation is not a one-time task. Instead, the analytics content can undergo continuous or periodic development. So-called hot-fix processes are automatically executed to update the analytics content in respective tenants. By way of non-limiting example, a dashboard can be considered. An initial release of the dashboard can be provided as analytics content. However, the development team that provided the dashboard can revise (update) the dashboard. The updated dashboard can be released to the ACN 302 as analytics content, and the ACN 302 can distribute the updated dashboard to appropriate customers (e.g., all customers, if the dashboard is public; select customers, if the dashboard is restricted).

In some implementations, the APIs 308 include an export API and an import API that can be called based on uniform resource locators (URLs) of respective analytics system tenants (e.g., https://<AS_tenant URL>/api/v1/content/jobs) and which respectively enable for export/import of content packages. In some examples, import refers to downloading content from the ACN to an analytics system tenant, and export refers to uploading content to the ACN from an analytics system tenant. In some examples, the export API accepts a list of content items as input and can collect any dependent data objects to create a content package. By way of non-limiting example, in an api/v1/content/jobs endpoint, a type parameter is included and is set to EXPORT or IMPORT. During an export API call, identifiers assigned to respective content (e.g., stories, models) present in the current tenant (source tenant) are set to be exported. All of the content specified, and any dependencies, are exported to the ACN as a new package in a background job. During an import call, the content present inside an ACN package is imported into the target tenant.

In some examples, each of the import API and the export API operates asynchronously. For example, a first call triggers import/export and a "job id" is returned, which can be used to poll for the status of the import/export job. After some time (e.g., seconds, minutes), the job is finished and the analytics content is imported/exported. In some examples, authentication is provided using authentication clients. For example, the open authentication (OAuth) protocol can be used for the authentication process. In some examples, authentication is performed using OAuth clients and a client credentials flow. In some examples, OAuth clients are created locally to a tenant (e.g., as part of the configuration of the tenant using the TC-API, described above). Consequently, these APIs are typically called from an application tenant, which can connect to its associated analytics system tenant.

Figure 4:
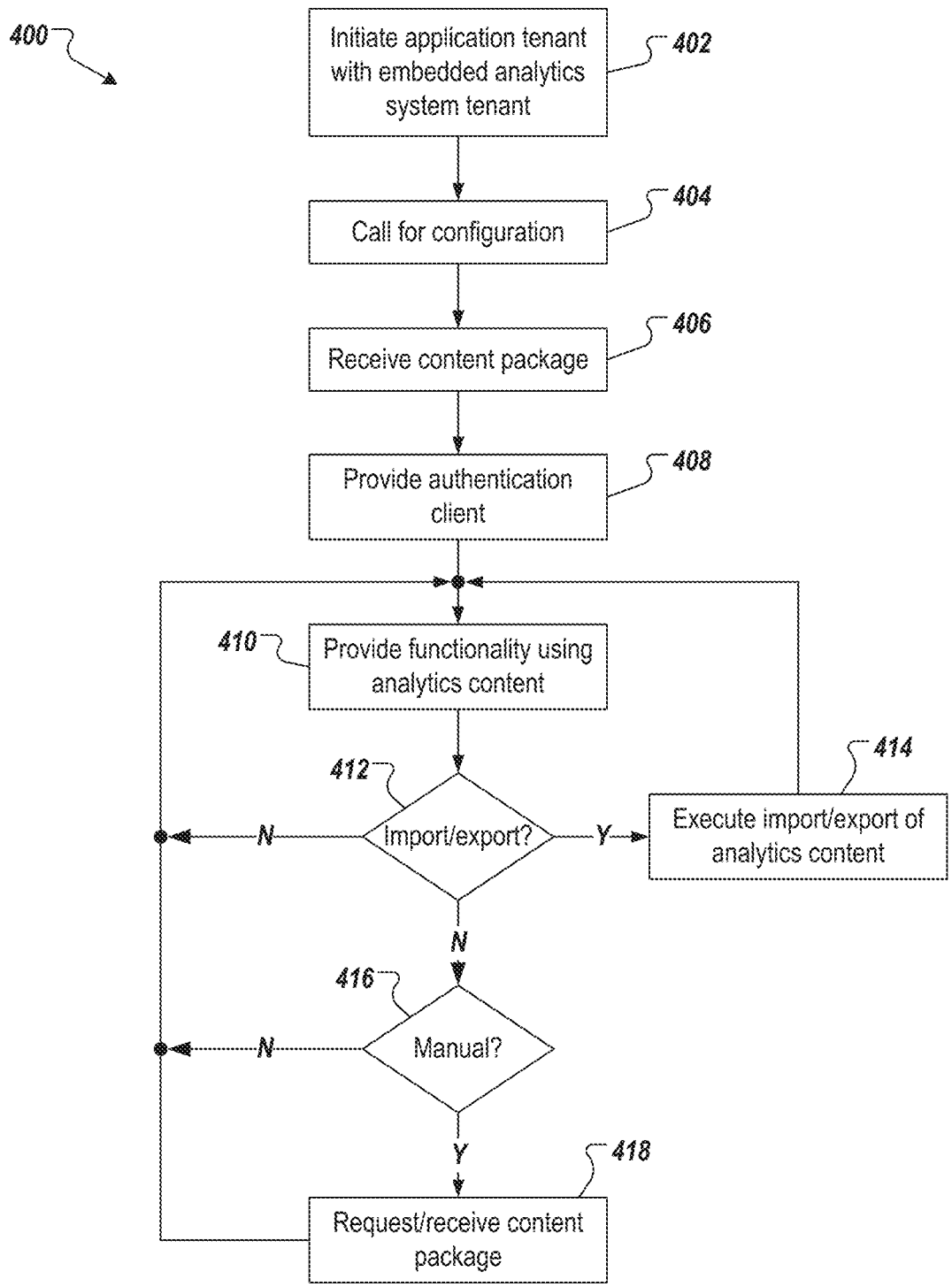
FIG. 4 depicts an example process that can be executed in accordance with implementations of the present disclosure.

FIG. 4 depicts an example process 400 that can be executed in accordance with implementations of the present disclosure. In some examples, the example process 400 is provided using one or more computer-executable programs executed by one or more computing devices.

An application tenant with an embedded analytics system tenant is initiated (402). For example, an application tenant and a respective analytics tenant can be started within a customer landscape, the analytics system tenant being embedded in the application tenant. A call for configuration is sent (404). For example, and as described herein, upon initiation of an analytics system tenant within a customer landscape, a configuration call can be made through the TC-API for a configuration file that is used to configure the analytics system tenant (e.g., https://api.analytics.system/oem//tenants/<AS_tenant uuid>/config). The call identifies a particular tenant using a UUID assigned to the tenant (AS_tenant uuid) and requests computer-executable configuration instructions (config). In some examples, one of the configurations is "ACN content import" (e.g., "SetAcnPackage" in the API payload). In some examples, the particular analytics content that is to be provided can be determined based on the UUID of the tenant. For example, the UUID can be mapped to one or more analytics content, which is then provided in a content package to be included in the API payload sent in response to the configuration request.

A content package is received (406). For example, in response to the configuration call, the API response payload includes the content package for the particular analytics system tenant. In some examples, the content package includes analytics content including one or more dashboards, and the like. An authentication client is provided (408). For example, and as part of the configuration of the analytics system tenant, an authentication client is provided within the customer landscape. In some examples, the authentication client is provided as an OAuth client that is used to provide a client credentials flow for authentication of requests to the APIs. In some examples, OAuth clients are created locally to a tenant (e.g., as part of the configuration of the tenant using the TC-API, described above). Consequently, these APIs are typically called from an application tenant, which can connect to its associated analytics system tenant.

Functionality is provided using the analytics content (410). For example, a user can interface with the application, and the analytics system embedded therein to view enterprise data and/or analytical data that is generated by the analytics system based on the enterprise data. By way of non-limiting example, the analytics content can include a dashboard that is displayed to the user and that is populated with enterprise data and/or analytics data.

It is determined whether an import and/or an export of analytics content is to occur (412). For example, and as described herein, analytics content can be updated, and updated analytics content can be distributed to one or more analytics system tenants. If an import and/or an export of analytics content is to occur, the import and/or the export of the analytics content is executed (414), and the example process 400 loops back. For example, the export API or the import API can be called based on URLs of respective analytics system tenants (e.g., https://<AS_tenant URL>/api/v1/content/jobs) and which respectively enable for export/import of content packages.

If an import and/or an export of analytics content is not to occur, it is determined whether a manual request has occurred (416). For example, it is determined whether a user has requested analytics content through the analytics system embedded within the application. In some examples, the user makes such a request through a content library UI, as discussed above. If a manual request has not occurred, the example process 400 loops back. If a manual request has occurred, a content package is requested and received (418), and the example process 400 loops back. For example, a call is made through an API, the call including a UUID of the analytics system tenant and an identifier uniquely identifying the requested analytics content. In some examples, the analytics content provided in the API payload in response to the request.

Figure 5:
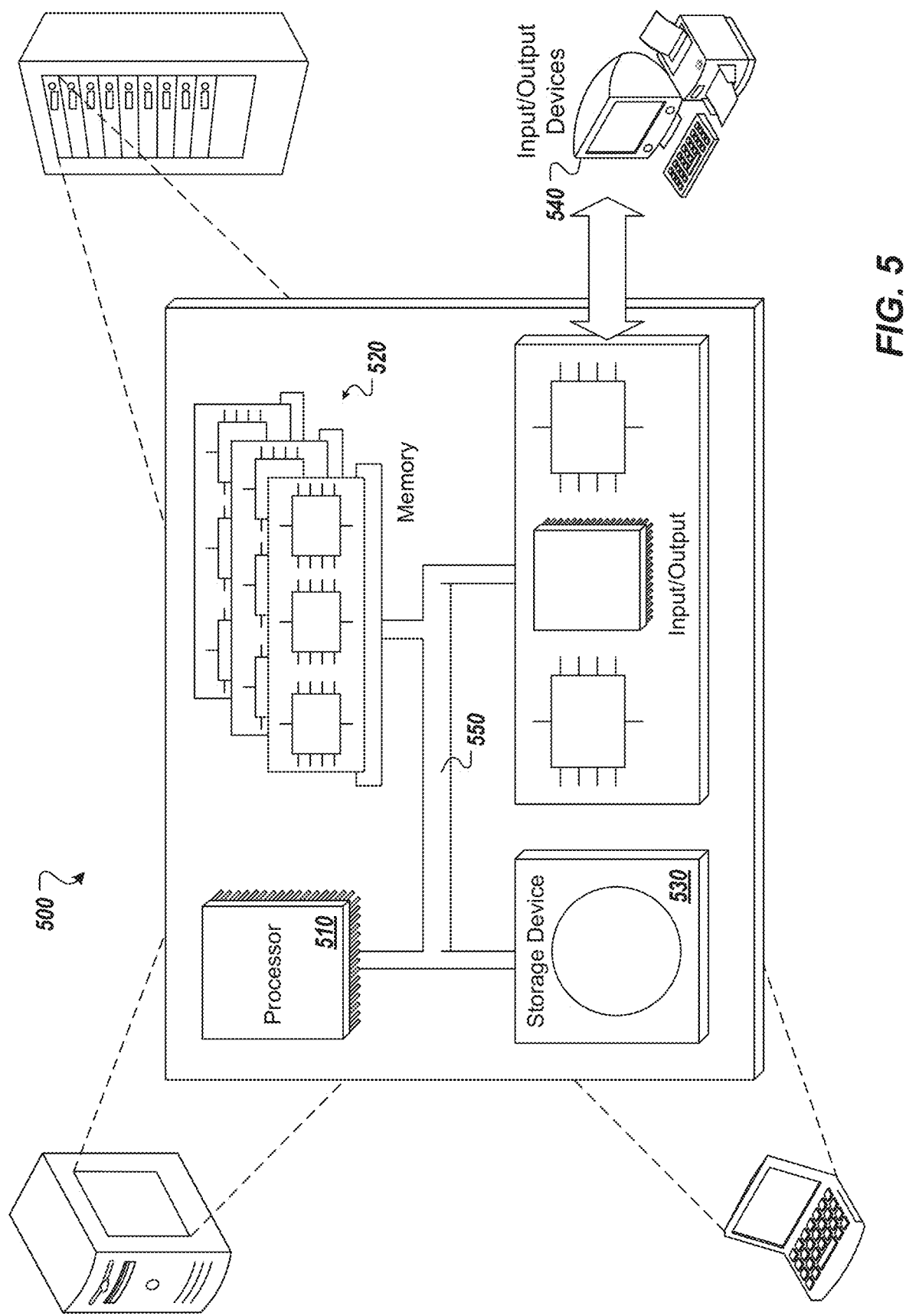
FIG. 5 is a schematic illustration of example computer systems that can be used to execute implementations of the present disclosure.

Referring now to FIG. 5, a schematic diagram of an example computing system 500 is provided. The system 500 can be used for the operations described in association with the implementations described herein. For example, the system 500 may be included in any or all of the server components discussed herein. The system 500 includes a processor 510, a memory 520, a storage device 530, and an input/output device 540. The components 510, 520, 530, 540 are interconnected using a system bus 550. The processor 510 is capable of processing instructions for execution within the system 500. In some implementations, the processor 510 is a single-threaded processor. In some implementations, the processor 510 is a multi-threaded processor. The processor 510 is capable of processing instructions stored in the memory 520 or on the storage device 530 to display graphical information for a user interface on the input/output device 540.

The memory 520 stores information within the system 500. In some implementations, the memory 520 is a computer-readable medium. In some implementations, the memory 520 is a volatile memory unit. In some implementations, the memory 520 is a non-volatile memory unit. The storage device 530 is capable of providing mass storage for the system 500. In some implementations, the storage device 530 is a computer-readable medium. In some implementations, the storage device 530 may be a floppy disk device, a hard disk device, an optical disk device, or a tape device.

The input/output device 540 provides input/output operations for the system 500. In some implementations, the input/output device 540 includes a keyboard and/or pointing device. In some implementations, the input/output device 540 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier (e.g., in a machine-readable storage device, for execution by a programmable processor), and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Elements of a computer can include a processor for executing instructions and one or more memories for storing instructions and data. Generally, a computer can also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, for example, a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer-implemented method for delivering analytics content to applications having analytics systems embedded therein, the method being executed by one or more processors and comprising:
   receiving, by an analytics content network (ACN), a configuration request through a tenant configuration application programming interface (TC-API) of a plurality of APIs, the configuration request comprising an identifier that uniquely identifies an analytics system tenant of a plurality of analytics system tenants, the analytics system tenant being embedded in an application tenant within a customer landscape of a plurality of customer landscapes, the ACN distributing analytics content to each customer landscape in the plurality of customer landscapes;
   determining, by the ACN, one or more analytics content that is to be distributed to the analytics system tenant at least partially by mapping the identifier to the one or more analytics content;
   providing, by the ACN, a content package that includes the one or more analytics content and a configuration file within an API payload for response to the configuration request, the configuration file being executable to create an authentication client locally to the analytics system tenant within the application tenant, each analytics system tenant in the plurality of analytics system tenants of each customer landscape in the plurality of customer landscapes having a respective authentication client, each authentication client providing a client credentials flow for authentication of client requests to APIs of the plurality of APIs external to the plurality of customer landscapes; and
   transmitting, by the ACN, a response to the configuration request through the TC-API, the response comprising the API payload.

2. The method of claim 1, wherein the plurality of APIs comprises an export API that is used to export analytics content from one or more analytics content providers to the ACN.

3. The method of claim 2, wherein one or more identifiers assigned to respective analytics content that is to be exported are included in an export API call for export of the respective analytics content and any dependencies to the ACN.

4. The method of claim 1, wherein the plurality of APIs comprises an import API that is used to import analytics content from the ACN to one or more analytics system tenants across the multiple customer landscapes.

5. The method of claim 1, wherein the authentication client uses an open authentication (OAuth) protocol to provide authentication of the application tenant for subsequent API calls from the application tenant.

6. The method of claim 1, wherein the content package is specific to the analytics system tenant.

7. The method of claim 1, wherein the analytics content comprises one or more of a dashboard, a key performance indicator (KPI) definition, and a planning scenario.

8. A non-transitory computer-readable storage medium coupled to one or more processors and having instructions stored thereon which, when executed by the one or more processors, cause the one or more processors to perform operations for delivering analytics content to applications having analytics systems embedded therein, the operations comprising:
   receiving, by an analytics content network (ACN), a configuration request through a tenant configuration application programming interface (TC-API) of a plurality of APIs, the configuration request comprising an identifier that uniquely identifies an analytics system tenant of a plurality of analytics system tenants, the analytics system tenant being embedded in an application tenant within a customer landscape of a plurality of customer landscapes, the ACN distributing analytics content to each customer landscape in the plurality of customer landscapes;
   determining, by the ACN, one or more analytics content that is to be distributed to the analytics system tenant at least partially by mapping the identifier to the one or more analytics content;
   providing, by the ACN, a content package that includes the one or more analytics content and a configuration file within an API payload for response to the configuration request, the configuration file being executable to create an authentication client locally to the analytics system tenant within the application tenant, each analytics system tenant in the plurality of analytics system tenants of each customer landscape in the plurality of customer landscapes having a respective authentication client, each authentication client providing a client credentials flow for authentication of client requests to APIs of the plurality of APIs external to the plurality of customer landscapes; and
   transmitting, by the ACN, a response to the configuration request through the TC-API, the response comprising the API payload.

9. The computer-readable storage medium of claim 8, wherein the plurality of APIs comprises an export API that is used to export analytics content from one or more analytics content providers to the ACN.

10. The computer-readable storage medium of claim 9, wherein one or more identifiers assigned to respective analytics content that is to be exported are included in an export API call for export of the respective analytics content and any dependencies to the ACN.

11. The computer-readable storage medium of claim 8, wherein the plurality of APIs comprises an import API that is used to import analytics content from the ACN to one or more analytics system tenants across the multiple customer landscapes.

12. The computer-readable storage medium of claim 8, wherein the authentication client uses an open authentication (OAuth) protocol to provide authentication of the application tenant for subsequent API calls from the application tenant.

13. The computer-readable storage medium of claim 8, wherein the content package is specific to the analytics system tenant.

14. The computer-readable storage medium of claim 8, wherein the analytics content comprises one or more of a dashboard, a key performance indicator (KPI) definition, and a planning scenario.

15. A system, comprising:
a computing device; and
a computer-readable storage device coupled to the computing device and having instructions stored thereon which, when executed by the computing device, cause the computing device to perform operations for natural language explanations for delivering analytics content to applications having analytics systems embedded therein, the operations comprising:
receiving, by an analytics content network (ACN), a configuration request through a tenant configuration application programming interface (TC-API) of a plurality of APIs, the configuration request comprising an identifier that uniquely identifies an analytics system tenant of a plurality of analytics system tenants, the analytics system tenant being embedded in an application tenant within a customer landscape of a plurality of customer landscapes, the ACN distributing analytics content to each customer landscape in the plurality of customer landscapes;
determining, by the ACN, one or more analytics content that is to be distributed to the analytics system tenant at least partially by mapping the identifier to the one or more analytics content;
providing, by the ACN, a content package that includes the one or more analytics content and a configuration file within an API payload for response to the configuration request, the configuration file being executable to create an authentication client locally to the analytics system tenant within the application tenant, each analytics system tenant in the plurality of analytics system tenants of each customer landscape in the plurality of customer landscapes having a respective authentication client, each authentication client providing a client credentials flow for authentication of client requests to APIs of the plurality of APIs external to the plurality of customer landscapes; and
transmitting, by the ACN, a response to the configuration request through the TC-API, the response comprising the API payload.

16. The system of claim 15, wherein the plurality of APIs comprises an export API that is used to export analytics content from one or more analytics content providers to the ACN.

17. The system of claim 15, wherein one or more identifiers assigned to respective analytics content that is to be exported are included in an export API call for export of the respective analytics content and any dependencies to the ACN.

18. The system of claim 15, wherein the plurality of APIs comprises an import API that is used to import analytics content from the ACN to one or more analytics system tenants across the multiple customer landscapes.

19. The system of claim 15, wherein the authentication client uses an open authentication (OAuth) protocol to provide authentication of the application tenant for subsequent API calls from the application tenant.

20. The system of claim 15, wherein the content package is specific to the analytics system tenant.

\* \* \* \* \*